March 13, 1962  B. VER NOOY  3,025,118
NON-WELDED PIG ASSEMBLY
Filed April 28, 1960  3 Sheets-Sheet 2
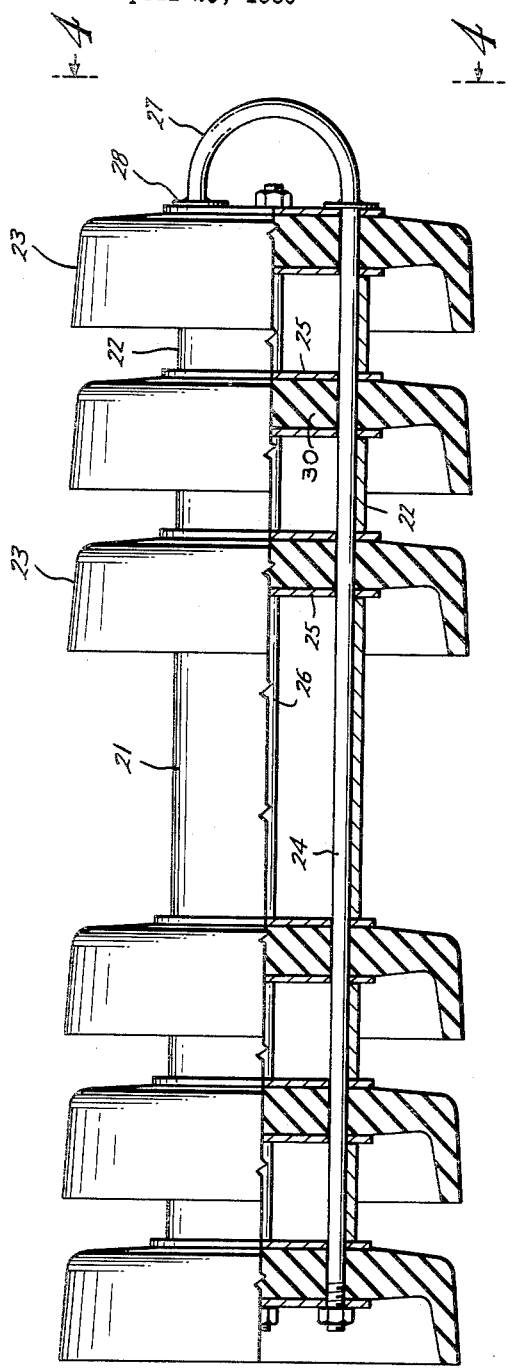
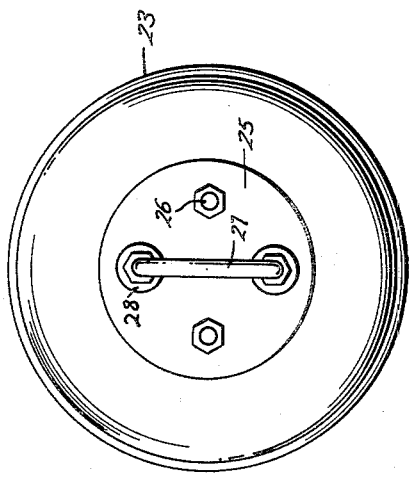
Burton VerNooy
INVENTOR.
BY Browning, Simms,
Hyer & Eichenroht
ATTORNEYS

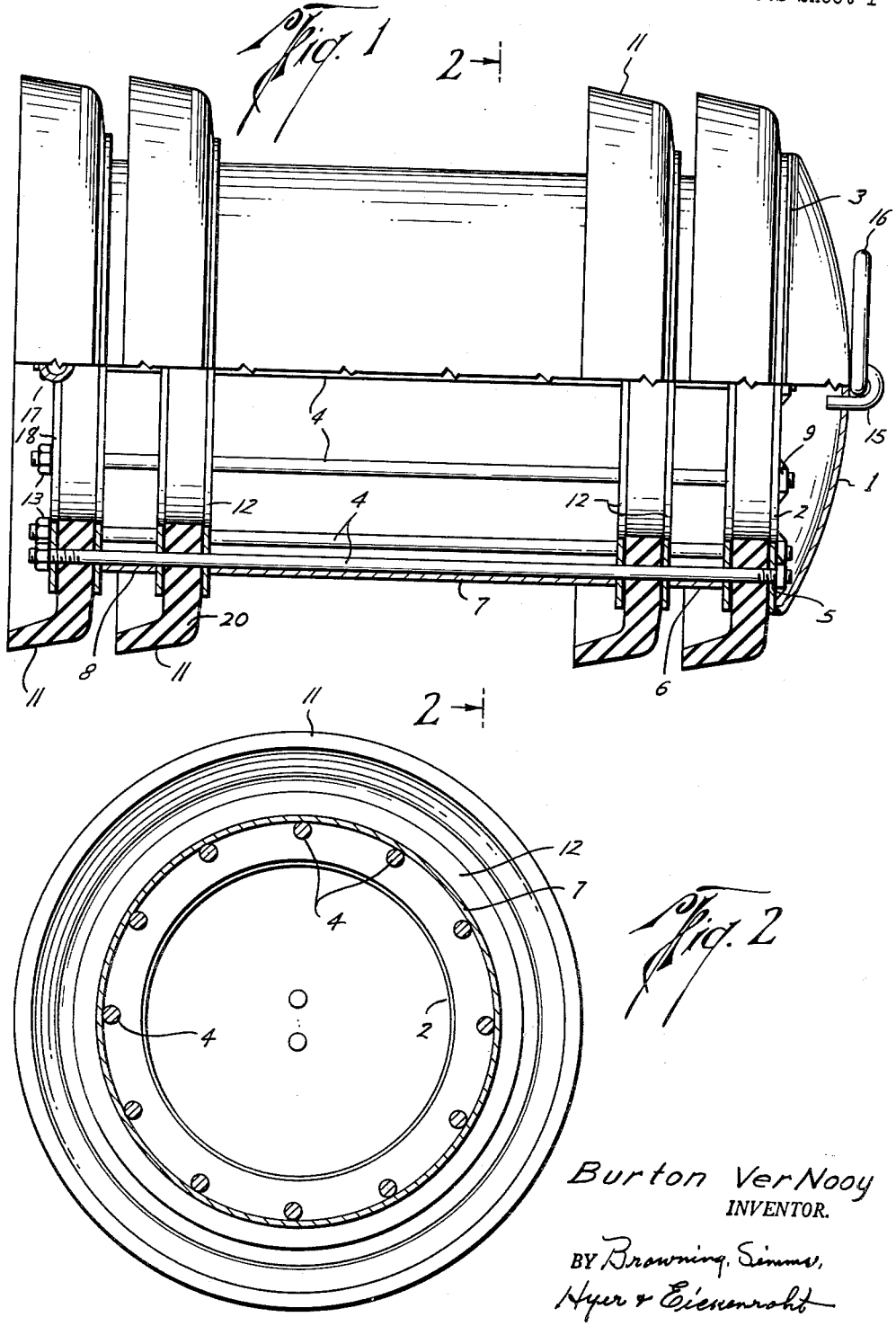

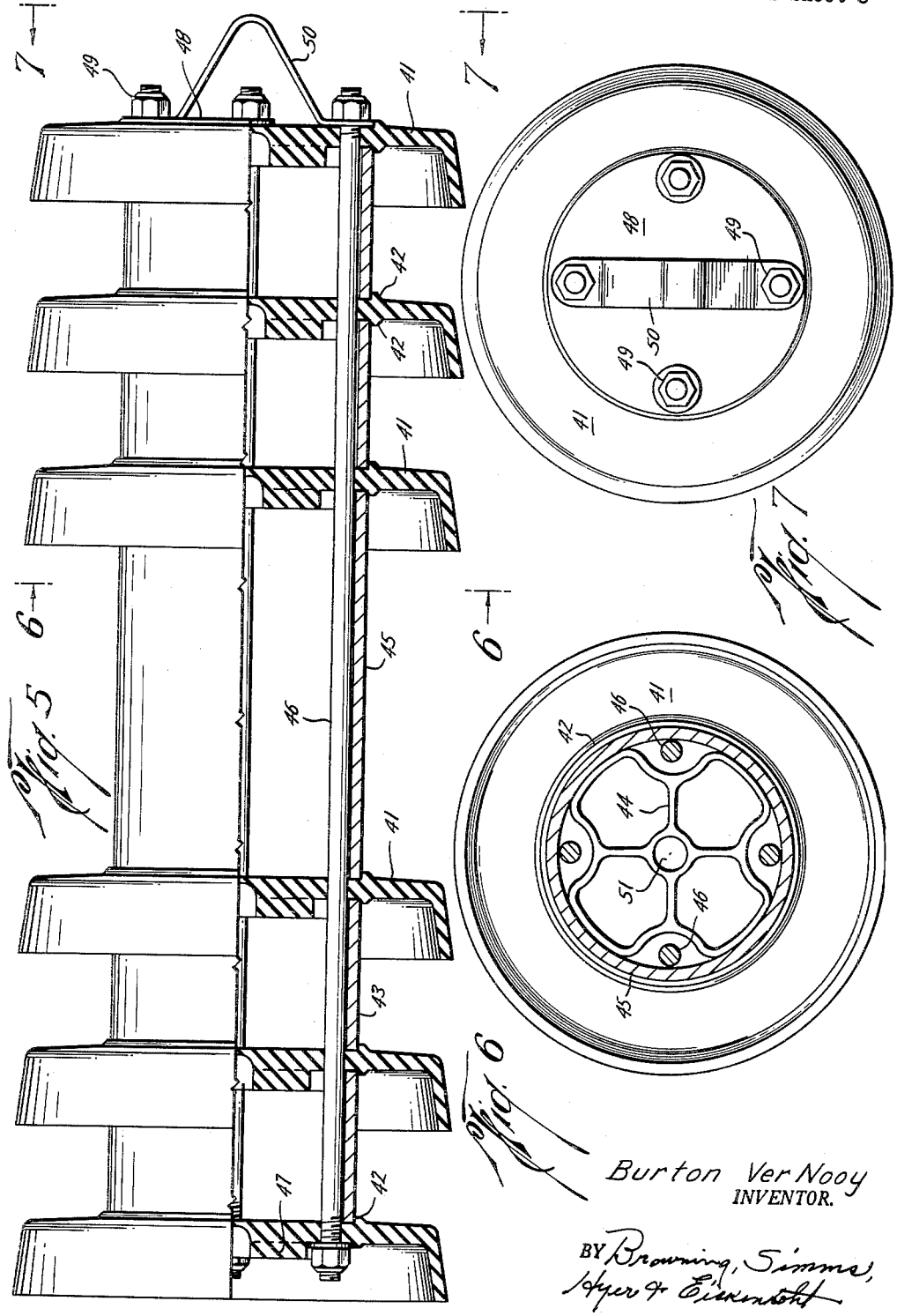

United States Patent Office 3,025,118
Patented Mar. 13, 1962

3,025,118
NON-WELDED PIG ASSEMBLY
Burton Ver Nooy, Tulsa, Okla., assignor to T. D. Williamson, Inc., Tulsa, Okla.
Filed Apr. 28, 1960, Ser. No. 25,482
15 Claims. (Cl. 309—4)

This invention relates to improvements in pipeline pigs commonly used for separating different fluids pumped through a pipeline. This application is a continuation-in-part of my copending application Serial No. 862,681, filed December 29, 1959, now abandoned.

It is often necessary to pump different fluids such as gasoline, kerosene, fuel oil and other petroleum products through the same pipeline in consecutive batches. Separation of various products in transit in the pipeline is accomplished by use of devices generally known as "pigs." The pigs commonly used comprise tubular bodies bearing annular sealing cups of petroleum resistant rubber or other flexible material disposed around the bodies to make sealing contact with the interior walls of the pipeline. As a rule, at least two or such annular sealing cups are disposed about each end of the tubular body.

Pigs separating different fluids in the pipeline are forced through the line by pressure from fluid behind the pig exerted on the body of the pig and sealing cups attached thereto. The interior of long pipelines is not perfectly smooth. Rough spots on the inner walls of the line due to imperfections in welding sections together may be present. Valves, T's and branch lines are present at intervals and the pipeline frequently makes turns, some of which may be quite sharp.

In order to obtain high capacity of pipeline for transporting fluids, speed of flow therein frequently is high, speeds in excess of 1,000 feet per minute being quite common. As a result, there is a great deal of wear upon the sealing cups and other members which make their replacement or repair necessary. Wear upon the lower part of the cups is especially severe since the weight of the pig is supported by the cups.

It is known that the bodies of pigs in such use must be strong and rigid in order to maintain the cups in sealing contact with the pipeline wall, to prevent loosening of sealing cups and twisting of the body under stresses imposed by contact of the cups with irregularities in the pipeline wall surfaces at high speed. Heavy welded bodies comprising tubular sections and plates welded thereto adapted to hold the cups in place have been used in the past.

It is an object of this invention to provide a pig of the class described which is very light in weight and long wearing in high speed use.

Another object is to provide a pig of this class comprising a number of identical, interchangeable, easily manufactured parts which can be manufactured with little or no welding.

Another object is to provide a pig of this class which has inherent low manufacturing and maintenance costs.

Another object is to provide a pig of this class in which all parts may be disassembled easily for replacement or repair.

Another object is to provide a pig of the class described which is adapted to be pulled through a pipeline by pressure applied to the leading end of the pig.

Another object is to provide a pig of this class in which irregular pressure against pipeline walls due to push-propulsion is eliminated.

Another object is to provide a pig of this class which can be made very short for negotiating sharp turns in the pipeline.

Another object is to provide a pig of this type in which rigidity of the body is obtained in a novel manner.

Still another object is to provide a pig particularly adapted for extensive use of aluminum, light weight aluminum alloys, foamed aluminum, or light weight plastics as construction materials.

Another object is to provide a pig which substantially eliminates leakage across sealing cups and which will remain substantially at the desired interface between batches during long trips through pipelines.

Still another object is to provide a pig construction which may be made so light that it is substantially without effective weight when immersed in oil in a pipeline.

Other objects, advantages and features of this invention will be apparent to one skilled in the art upon a consideration of the written specification, the attached claims and the annexed drawings.

In the present invention a hollow cylindrical pig body is provided which may be open at the back and may be closed only at the front. Closure at the front end only will result in a pull type of propulsion of the pig through a line in response to pressure of fluid in the line behind the pig, and will substantially eliminate the tendency of the pig to weave or "snake" as it passes through the line. Elimination of this weaving motion greatly reduces friction and wear upon the sealing cups.

The cylindrical body of the pig is made up of a number of discrete sections. The discrete sections comprise right cylinders such as may be formed by cutting sections from a pipe at right angles to its axis, and preferably are made of a material which is oil resistant, strong and light in weight such as aluminum, light aluminum alloys, foamed aluminum and strong light weight plastics such as "Marlex."

A plurality of annular sealing cups are carried by and surround the body in position to make sealing contact with the interior wall of the pipeline. The sealing cups are singly disposed along the length of the pig body and are disposed to include one of the discrete sections of the body between each two successive cups. The cups may be made of an oil resistant rubber, or other suitable material such as strong, light weight oil resistant plastics. Polyurethane plastics are preferred materials for the construction of the cups because of their strength and resistance to deterioration under contact with oil, gas and other materials usually present in pipelines, and also because of their high strength relatively thin cups, and therefore light in weight, may be used.

The discrete sections of the tubular body may include annular cup retaining members disposed on each side of each of the cups, or the annular members may be omitted, depending on the design and material of the sealing cups. When rubber cups are used, the cup retaining members usually are required, but when the sealing cups are made of a polyurethane plastic or similar material, the retaining members can be omitted, since the stronger plastic does not require their support. When the cup retaining members are used, they are flat, washer-like annuli, preferably of the same material as the right cylinders and have an inner diameter smaller than the diameter of the right cylinders and an outer diameter greater than the diameter of the cylinders. The ends of the cylinders are in contact with the annular cup retaining members when the latter are used, but need not be welded or otherwise attached to them individually. When cups of polyurethane or similar strong plastic material are used, the short cylinders abut directly upon the cups.

The front end of the body is closed by a suitable closure member which may be either a plate or dome of metal if desired, or may be formed as an integral part of the leading cup, especially when polyurethane cups are used.

The entire body is held together by suitable mechanical means for applying longitudinal presure to all of the cups and discrete body sections. This means for holding all of the cups and the body sections together, and for supplying rigidity to the body, preferably is comprised of three or more throughbolts passing entirely through the body from front to rear. The throughbolts are preferably disposed equidistant from each other on the circumference of a circle, or circles, of such size so as to bring all throughbolts into firm lateral contact with all right cylinders throughout the length of such cylinder. The right cylinders, cup retaining members when used, and front closure member are all maintained under compressive force which is conveniently applied by a threaded nut screwed onto suitable threads on an end of each throughbolt.

A pig constructed as just described is very easily assembled or disassembled. To disassemble the pig it is merely necessary to unscrew a nut from the end of each throughbolt. This leaves all parts in condition to slide off the throughbolts and permits ease in substituting a repair part and then reassembling the pig. Welding of any of the parts is not necessary in this operation.

A pig constructed in this manner is particularly adapted to be made of light weight material. The total weight of such a pig, using polyurethane cups and a body of a strong, light weight plastic material such as "Marlex," or constructed of foamed aluminum, is so low that it is substantially equal to the weight of oil displaced by the pig when the pig is immersed in an oil contained in a pipeline. As a result, the pig has substantially no effective weight as it floats in oil contained in a pipeline, and friction, due to weight of the body of the pig carried on cups in contact with the bottom of the pipeline, is substantially eliminated. Most all friction, resulting in resistance to motion of the pig in the pipeline, is due to the necessity of sealing contact of the outer periphery of the cups with the pipeline walls.

The low weight and low friction of a pig of this type of construction not only results in long wear of the cups, but also permits the pig to remain substantially at the desired interface between two successive batches of material transported in the line. This reduction of friction reduces the pressure drop normally present across pigs of conventional construction and consequently, there is less leakage past the cups. Less mixing of consecutive batches of fluid transported in the pipeline will occur and corresponding less contamination of a leading batch by a following batch of a different fluid.

In the drawings, wherein like reference characters are used throughout to designate like parts:

FIG. 1 is an elevation, partly in section, of a pig constructed according to the principles of this invention;

FIG. 2 is a cross section of the pig shown in FIG. 1 on the line 2—2 thereof;

FIG. 3 is a modified pig constructed according to the principles of this invention;

FIG. 4 is a cross section of the pig shown in FIG. 3 on the line 4—4 thereof;

FIG. 5 is a side elevation, partly in section, of a pig having cups of a strong plastic material and a body modified to take advantage of the properties of the cup;

FIG. 6 is a vertical section through the pig of FIG. 5 on the line 6—6 thereof; and FIG. 7 is an elevation of the front end of the pig of FIG. 5.

The particular device illustrated in FIGS. 1 and 2 shows a pig having a hollow cylindrical body open at the back (to the left on the drawings). This body is closed at the front end of the pig by a closure member 1, which preferably is domed, as shown, and is concave on its rearward side with the concavity facing the interior of the pig. Closure member 1 is attached to the cup retaining ring 2, preferably by welding along the line 3, as shown. Alternatively, the front cup retaining ring 2 and domed body closure member 1 may be made integral. The welded construction illustrated is preferred because of the cheapness and ease with which leakproof attachment is made. The weld along the line 3, attaching closure member 1 to front retaining ring 2, is the only weld necessary or desirable in the manufacture of this pig.

The cylindrical body of the pig of this invention is composed of a plurality of discrete sections. Each of these sections is made up of a hollow cylindrical part designated as 6, 7 and 8 in the drawings, and a pair of cup retaining members 12, singly disposed at each end of each of the hollow cylindrical parts. Parts 6, 7 and 8 preferably are manufactured by cutting through a pipe of proper diameter upon planes normal to the axis of the pipe. The cylindrical parts 6, 7 and 8 have the same diameter, but may have any length desired.

The cup retaining members illustrated are flat annular rings having outside diameters greater than, and inside diameters less than, the common diameter of cylindrical parts 6, 7 and 8. In the preferred construction illustrated, each of the cylindrical parts 6, 7 and 8, and each of the cup retaining members 12, are discrete parts.

A plurality of sealing cups 11 made of a flexible material such as a petroleum resistant rubber are singly disposed around the body at each end of the discrete sections in such a position to make sealing contact with the interior wall of a pipeline when the pig is inserted therein. Front retaining member 2, retaining members 12 disposed at each end of the discrete body sections, and back retaining member 18 disposed behind, and in contact with the rearmost cup, make up a series of adjacent pairs of retaining members. An inner part 20 of a cup 11 is disposed between each pair of adjacent retaining members.

A mechanical means for holding all of the discrete sections of the body together under pressure is illustrated as a series of throughbolts 4 having threaded portions 5 and nuts 13 disposed thereon. Each of the retaining members 2, 12 and 18, and each of the inner portions 20 of cups 11 are perforated for snug fit upon throughbolts 4.

The number of throughbolts 4 that will be used in the construction of any pig depends principally upon the diameter of the pig. At least 3 throughbolts are necessary for pigs of small diameter and it is preferred that the number of throughbolts be increased as the diameter of the pig increases. In the particular pig illustrated in FIGS. 1 and 2, twelve throughbolts are used, since this pig is intended to illustrate a batching pig for a large pipeline.

The throughbolts are spaced equidistant from each other upon the diameter of a circle of such size that the sides of the throughbolts are maintained in firm lateral contact with the surfaces of all cylindrical parts 6, 7, and 8 throughout the lengths of these parts. It is preferable that this contact is made with the interior surfaces of the cylindrical parts, as illustrated, rather than with the outside surfaces because a greater stiffness and rigidity of the body is obtained by placing the throughbolts on the inside of the cylindrical parts. However, the throughbolts may be disposed in firm lateral contact with the outside surfaces of the cylindrical parts, or the throughbolts may be staggered alternately on the inside or outside surfaces of the cylindrical parts if desired.

A handling ring 16 is connected to the front end of the pig by a suitable connecting device 15. When the body of the pig is made of aluminum, which is a preferred metal for its construction, it is often desirable to have the connecting device 15 run entirely through the pig, and be attached to a cross member 17 at the rear of the pig, in order to prevent undue stress on closure member 1 when lifting or handling the pig.

It will be seen that the construction just described is a particularly desirable one for light weight pigs since substantially all parts, other than throughbolts 4, are preferably made of aluminum. Any number of cups 11 may be used and these cups are preferably disposed in a series at each end of the pig, usually with two or three cups in each series.

The cylindrical parts 6 and 8, between cups of a single series, are preferably all of identical length and interchangeable. The central cylindrical part 7 should be long enough that the number of throughbolts 4 used will impart sufficient rigidity to the pig to prevent twisting of the body as a result of impacts due to rough spots, valves, branch lines, T's and other obstructions which may be encountered in traversing the inner wall of the pipeline. So long as all throughbolts 4 are in firm contact with the inner surfaces of the cylindrical parts, such twisting and loosening of the body will not occur.

The construction illustrated in FIGS. 1 and 2 has the further advantage that the pig is driven through the pipeline by pressure of fluid flowing through the pipeline exerted on the concave inner face of closure member 1. Thus, the pig is drawn through the line, rather than pushed. Tendency of the pig to "snake" as it runs through the pipeline is therefore eliminated, and with the elimination of this tendency a great deal of wear upon the cups is also eliminated. It will be seen that a pig of the construction just described is very easily assembled. Its cost of manufacture is low because the cylindrical parts may be merely cut out of an aluminum pipe of the proper dimensions, and the cup retaining members 2, 12 and 18 may be cut out of a sheet metal, which also is preferably of aluminum. A decrease in weight resulting from the use of this light metal in the construction just described eliminates a great deal of wear upon the lower side of the cup in contact with the bottom of the interior wall of the pipeline.

FIGS. 3 and 4 illustrate a modified pig constructed of discrete parts, as described above, but do not show the feature of a front end drive, which characterizes the pig illustrated in FIGS. 1 and 2. The pig of FIG. 3 has a substantially cylindrical body made up of a number of discrete sections. Each of these sections is composed of a cylindrical part 21 or 22, having a cup retaining member 25 disposed at each end of the cylindrical part. These cup retaining members 25 are not flat annuli, as shown in FIG. 1, but are discs. In this modification, the front plate and back plate are identical in form with plates 25, and cups 23 are disposed between these plates which are cup retaining members.

Inner parts 30 of cups 23 are continuous across the diameter of the pig body.

The entire assembly comprising the short cylindrical parts 22, longer central cylindrical part 21, cup retaining plates 25, and cups 23, is held together by throughbolts 26 passing through snug fitting openings in each of the cups 23 and plates 25. A pair of throughbolts placed diametrically opposite from each other are modified by being formed into a single U-bolt 24, having a shoulder 28 which lies flush against the front plate of the pig. The curved part 27 of this U-bolt serves to stiffen the front plate of the pig and thus performs one of the functions of the domed body closure member 1, shown in FIG. 1.

The pig modified as shown in FIGS. 3 and 4, is propelled through the line by pressure applied to the back end thereof and to the back plate and cups 23. Pigs of this type are particularly useful in pipelines of small diameters where high separating efficiency is desired.

The two series, consisting of three cups each, are quite efficient in preventing mixing of liquid behind the pig with liquid ahead of it in the pipeline. Since the pig is intended for use with pipelines having small diameters, the weight of the pig is relatively small and is distributed upon a larger number of cups than is shown in FIGS. 1 and 2, thus decreasing localized pressure and wear upon the cups which contact the bottom of the inner pipeline wall.

The lateral position of throughbolts 26 and U-bolt 24 is such that they are in firm contact with all cylindrical parts 21 and 22 throughout the length of the pig. Even with the elongated form of pig illustrated in FIGS. 3 and 4, sufficient stiffness is supplied to the body by firm lateral contact of the U-bolt and throughbolts with the surfaces of all cylindrical parts, which will result in substantially no loosening or twisting of the body when in long service at high speed in a pipeline.

FIGS. 5, 6 and 7 show a modification of the pig of this invention which has a design particularly advantageous for use with sealing cups made from a strong plastic resin such as a polyurethane and with cylindrical body sections of an oil resistant plastic material such as "Marlex." It will be noted that this modification is similar to the pig shown in FIG. 3, but with the cup retaining members 25 omitted therefrom, and other modifications advantageous in adapting the pig for use with polyurethane cups and plastic body sections.

It will also be observed that cups 41 are much thinner in section than the cups shown in FIG. 1, and are made with annular shoulders 42 adapted to engage the outer periphery of the ends of right cylinders 43 abutting upon cups 41. Cups 41 are formed with a reticulum of reinforcing ribs 44 on their back surfaces to give the required strength and stiffness to the cups. These reinforcing ribs are formed on the back side of the cup and the front side of the cup is planar because stresses tend to stretch the front side and compress the rear side.

The front face of the cup is made flat and planar when closed cups are desired, or there may be perforations 51 entirely through the cup in a space between ribs 44 when closure at the front end of the pig only is desired. The closed cup having a planar front surface is much stronger than the perforated cup and will sometimes be preferred because of this strength, especially for use in pipelines of relatively small diameter where weaving motion of the pig is not great.

A preferred type of construction utilizes two series each consisting of three cups, with one cup being separated from the next cup in the series by a short ring cylinder 43, and with the two series being separated by a longer cylinder 45. This arrangement of cups eliminates substantially all leakage across the end of the pig in the pipeline, prevents loss of head at T, valves and other pipeline intersections, and is easily arranged to have a short turning radius.

The right cylinders are preferably constructed of a foamed aluminum or a strong light weight plastic material such as "Marlex." The use of light weight materials in a pig of this design is particularly advantageous since abutment of the cylinders upon relatively elastic cups prevents any bending or battering of the ends of the cylindrical sections.

The front end of the pig is closed by the use of a suitable closure member which may be a metal plate or dome, or merely a reinforced imperforate portion of the leading cup which will usually be of sufficient thickness to fill the annular shoulder 42 on the front side of the leading cup substantially flush with the top of the shoulder. The rear end of the pig is closed by a circular plate 47 which may be imperforate in its central section, or may be annular in shape when it is desired to introduce pressure from behind the pig to the front end of the pig.

All cups, and the front and rear end plates, have openings through them of such size so as to receive throughbolts 46. These openings lie upon the circumference of a circle, and are preferably spaced at equal angular distance from each other. The circle has a radius such that throughbolts disposed through the openings are brought into firm lateral contact with the inside surfaces of each of the cylindrical sections 45 and 43 throughout the length of the sections.

Nuts 49 are screwed onto suitable threads at the ends of each of the throughbolts and furnish a means for applying pressure to all cups and body sections of the pig throughout its length to hold the cups and cylinders together and impart stiffness to the body. It is preferred that a curved strap 50 be attached to each of a pair of throughbolts at the front end of the pig which furnishes a means for handling the pig by a crane or other handling equipment.

From the foregoing it will be seen that this invention is one well adapted to attain all of the ends and objects hereinabove set forth, together with other advantages which are obvious and which are inherent in the apparatus.

It will be understood that certain features and subcombinations are of utility and may be employed without reference to other features and subcombinations. This is contemplated by and is within the scope of the claims.

As many possible embodiments may be made of the invention without departing from the scope of this invention, it should be understood that all matter herein set forth or shown in the accompanying drawings is to be interpreted as illustrative and not in a limiting sense.

The invention having been described, what is claimed is:

1. A pig of the class described comprising in combination a substantially cylindrical body adapted to be inserted into a pipeline and composed of discrete sections in end-to-end relationship, said discrete sections comprising hollow right cylinders; a plurality of sealing cups carried by the body in position to make sealing contact with the interior wall of the pipeline, said sealing cups being singly disposed along the length of the body to include one of said discrete sections between each two successive cups; and not less than three throughbolts extending through all cups and in firm lateral contact with the surface of each of said right cylinders throughout the length of each cylinder.

2. The pig of claim 1 in which the throughbolts are located equidistant from each other upon the circumference of a circle, and in firm lateral contact with the interior surface of each of said hollow right cylinders throughout the length of each cylinder.

3. A pig of the class described comprising in combination a substantially cylindrical body adapted to be inserted into a pipeline and composed of discrete sections in end-to-end relationship, said discrete sections comprising hollow right cylinders of a light weight oil resistant material and a pair of discrete cup retaining members singly disposed at each end of each cylinder; a plurality of annular sealing cups carried by the body in position to make sealing contact with the interior wall of the pipeline; said sealing cups being singly disposed along the length of the body with one of said discrete sections between each two successive cups; and not less than three throughbolts extending through all cups and in firm lateral contact with the interior surface of each of said right cylinders throughout the length of each cylinder.

4. A pig of the class described comprising in combination a substantially cylindrical body adapted to be inserted into a pipeline and composed of discrete sections in end-to-end relationship, said discrete sections comprising hollow right cylinders of aluminum; a closure member disposed to close the front end of the pig; a plurality of annular sealing cups carried by the body in position to make sealing contact with the interior wall of the pipeline, said sealing cups being singly disposed with one of said discrete sections between successive cups; and not less than three throughbolts extending through all cups and in firm lateral contact with all of said right cylinders.

5. The pig of claim 3 having a total weight substantially equal to the weight of a volume of oil equal to the total volume of the pig.

6. A pig of the class described comprising in combination a substantially hollow cylindrical body adapted to be inserted into a pipeline and composed of discrete sections in end-to-end relationship, each discrete section comprising a discrete right cylindrical part and a pair of discrete cup retaining members singly disposed at each end of the cylindrical part; a plurality of sealing cups carried by the body in position to make sealing contact with the interior wall of the pipeline, said sealing cups being singly disposed along the body to include one of said discrete sections between each two successive cups; a front cup retaining member disposed in front of and in contact with the foremost cup; a back cup retaining member disposed behind and in contact with the rearmost cup; a closure member disposed to close the front end of the pig; and at least three throughbolts extending through all cup retaining members and cups in firm lateral contact with each of said cylindrical parts throughout the length of each of said parts.

7. The pig of claim 6 wherein the throughbolts are spaced substantially equidistant from each other upon the circumference of a circle.

8. The pig of claim 6 wherein each of the throughbolts is in firm lateral contact with the interior surface of each of the cylindrical parts.

9. The pig of claim 6 wherein all cups have openings therethrough disposed to admit fluid under pressure from the pipeline behind the pig to the rear side of said closure member; and all cup retaining members are flat annuli having outside diameters greater than, and inside diameters less than, like diameters of the cylindrical parts.

10. The pig of claim 9 wherein the body closure member is concave on its rear side and is attached to the front retaining member.

11. A pig of the class described comprising in combination a substantially cylindrical body adapted to be inserted into a pipeline and composed of discrete sections; each of said discrete sections comprising a discrete hollow cylindrical part and a pair of discrete cup retaining members singly disposed at each end of the hollow cylindrical part; a closure member disposed to close the front end of the body; a plurality of sealing cups singly disposed around the body at each end of each of said discrete sections in position to make sealing contact with the interior wall of a pipeline, each of said sealing cups having an inner part disposed between adjacent cup retaining members; and not less than three throughbolts extending through all cup retaining members and cups, in firm lateral contact with all cylindrical parts throughout the length of each of said cylindrical parts.

12. The pig of claim 11 in which the throughbolts are spaced substantially equidistant from each other upon the circumference of the circle.

13. The pig of claim 11 in which the throughbolts are in firm lateral contact with the interior surfaces of all cylindrical parts.

14. The pig of claim 11 wherein all cups are annular, and all cup retaining members are flat annuli having outside diameters greater than, and inside diameters lesser than, like diameters of the cylindrical parts.

15. The pig of claim 11 wherein the body closure member is concave on its rear side and is attached to the front cup of the retaining member.

References Cited in the file of this patent

Williamson, Inc., Type SBN–4 PIG., Bulletin A–490, January 15, 1951. Copy in Division 27.